United States Patent
Kumar et al.

(10) Patent No.: US 11,818,785 B2
(45) Date of Patent: Nov. 14, 2023

(54) REESTABLISHMENT CONTROL FOR DROPPED CALLS

(71) Applicant: ZEBRA TECHNOLOGIES CORPORATION, Lincolnshire, IL (US)

(72) Inventors: Pawan Kumar, Bangalore (IN); Mohan P. Kumar, Bangalore (IN); Deepak Ayyagari, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/061,190

(22) Filed: Oct. 1, 2020

(65) Prior Publication Data

US 2022/0110178 A1 Apr. 7, 2022

(51) Int. Cl.
*H04W 76/19* (2018.01)

(52) U.S. Cl.
CPC .................................. *H04W 76/19* (2018.02)

(58) Field of Classification Search
CPC ....... H04W 76/19; H04W 4/16; H04W 88/06; H04W 88/10; H04M 1/2472; H04M 1/57; H04M 1/2473
See application file for complete search history.

(56) References Cited

U.S. PATENT DOCUMENTS

| | | | | |
|---|---|---|---|---|
| 5,790,652 A * | 8/1998 | Gulley | .............. | H04M 1/27475 379/433.07 |
| 6,535,730 B1 * | 3/2003 | Chow | .................. | H04W 76/15 379/202.01 |
| 6,771,760 B1 * | 8/2004 | Vortman | .............. | H04M 3/5191 379/209.01 |
| 2002/0183044 A1 * | 12/2002 | Blackwell | ............ | G06Q 10/107 455/466 |
| 2003/0064716 A1 * | 4/2003 | Gailey | .................... | H04W 4/16 455/414.1 |
| 2004/0219952 A1 * | 11/2004 | Bernhart | ........... | H04M 1/72481 455/566 |
| 2004/0264679 A1 * | 12/2004 | Dobler | ................ | H04M 1/2749 379/355.02 |
| 2004/0266405 A1 * | 12/2004 | Benco | .................... | H04M 3/424 455/414.1 |
| 2005/0075115 A1 * | 4/2005 | Corneille | .................. | G06F 8/61 455/414.1 |
| 2007/0274488 A1 * | 11/2007 | Callaghan | .............. | H04W 76/19 379/201.01 |
| 2008/0037746 A1 * | 2/2008 | Dufrene | ................ | H04M 7/006 379/201.01 |

(Continued)

OTHER PUBLICATIONS

A decentralized approach for convention emergence in multi-agent systems, Mihail et al., Springer (Year: 2014).*

*Primary Examiner* — Un C Cho
*Assistant Examiner* — Lalita W Pace

(57) ABSTRACT

A method of reestablishing a communication session between a first computing device and a second computing device includes, at the first computing device: obtaining initiator status data, indicating whether the first computing device initiated the communication session; configuring a redial indicator according to the initiator status data; and presenting the redial indicator on a display of the first mobile computing device during the communication session.

13 Claims, 6 Drawing Sheets

(56) References Cited

U.S. PATENT DOCUMENTS

| | | | |
|---|---|---|---|
| 2010/0037311 A1* | 2/2010 | He | H04L 63/20 |
| | | | 709/227 |
| 2013/0029656 A1* | 1/2013 | Gilson | H04W 76/19 |
| | | | 455/422.1 |
| 2016/0183156 A1* | 6/2016 | Chin | H04L 61/2007 |
| | | | 370/331 |
| 2018/0262643 A1* | 9/2018 | Zhang | H04N 1/32765 |

* cited by examiner

REESTABLISHMENT CONTROL FOR DROPPED CALLS

BACKGROUND

Communication sessions such as voice calls, video calls and the like may be terminated unexpectedly, e.g. due to network congestion or other infrastructural failures. Multiple concurrent attempts to reestablish such communication sessions may cause the reestablishment to fail.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
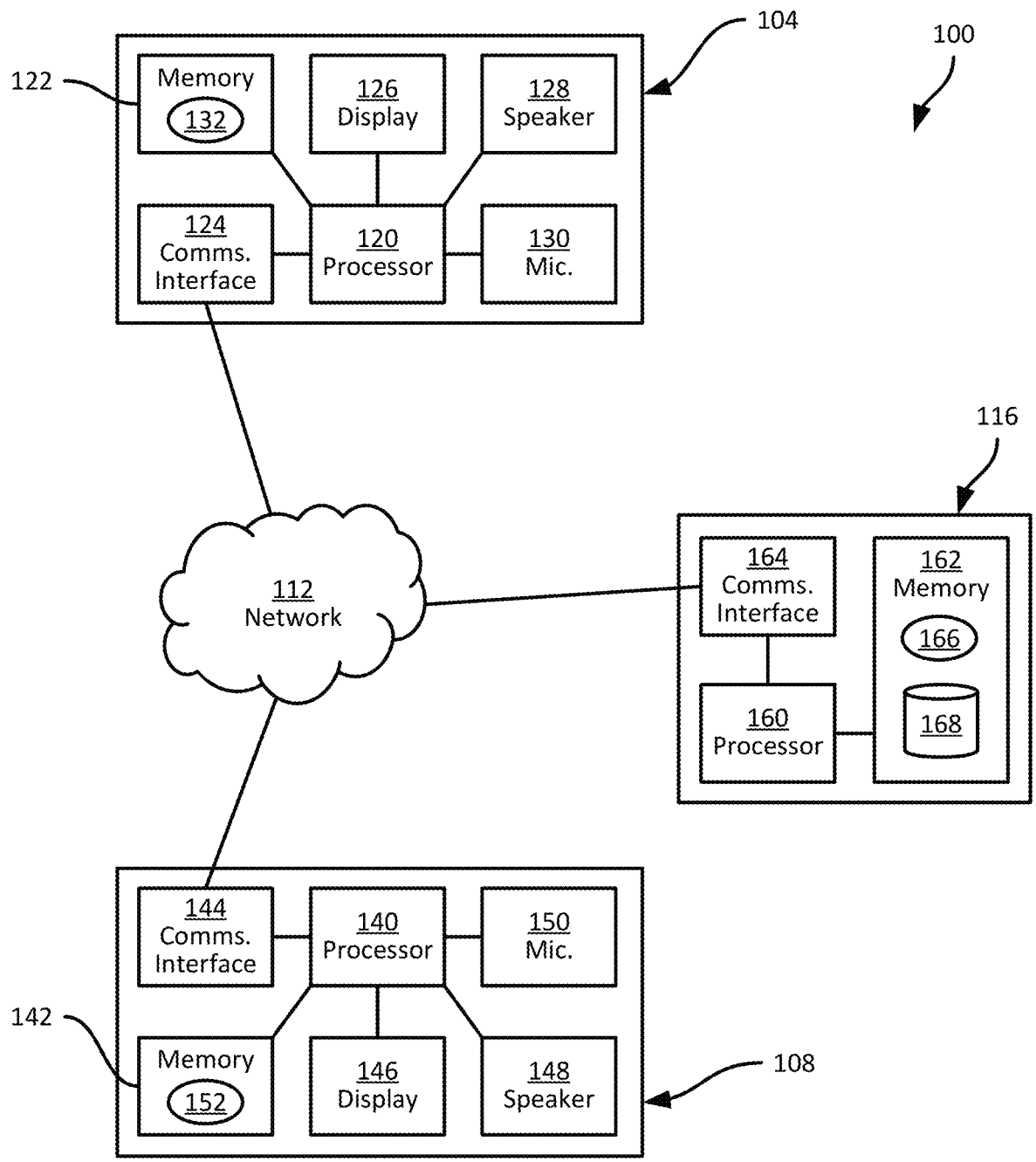
FIG. 1 is a diagram of a communication system, including internal components of the devices and the server therein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of reestablishing a communication session between a first computing device and a second computing device includes, at the first computing device: obtaining a communication session initiation parameter, indicating whether the first computing device initiated the communication session; configuring a redial indicator according to the communication session initiation parameter; and presenting the redial indicator on a display of the first mobile computing device during the communication session.

Additional examples disclosed herein are directed to a computing device, comprising: a communication interface configured to join a communication session between the computing device and a second computing device; an output device; and a processor interconnected with the communication interface and the output device, the processor configured to: obtain a communication session initiation parameter, indicating whether the computing device initiated the communication session; configure a redial indicator according to the communication session initiation parameter; and control the output device to present the redial indicator during the communication session.

Further examples disclosed herein are directed to a session control method at a server connected to a first computing device and a second computing device, the method comprising: responsive to establishment of a communication session between the first computing device and the second computing device, storing a communication session initiation parameter indicating which of the first computing device and the second computing device initiated the communication session; responsive to termination of the communication session, determining whether the termination was expected; and when the termination was not expected, during a time period following the termination, responsive to receiving a command to reestablish the communication session from one of the first and second computing devices, handling the command according to the communication session initiation parameter.

FIG. 1 illustrates a communication system 100 enabling communications between a first computing device 104 and a second computing device 108. The first and second computing devices 104 and 108 may be interconnected by a network 112, which can include a suitable combination of local and wide-area networks, including cellular networks, the Internet, and the like. The computing devices 104 and 108 can be mobile computing devices such as smart phones, tablet computers, laptop computers or the like. In other examples, either or both of the computing devices 104 and 108 can be desktop computers or other devices with fixed physical positions.

The computing devices 104 and 108 can establish communication sessions with each other over the network 112. The communication sessions can include voice calls (e.g. using Voice over IP (VoIP) or other technologies), video calls, or the like. In general, the communication sessions as discussed herein are substantially real-time communication sessions, which may also be referred to as synchronous communications, rather than asynchronous communications such as email.

The system 100 may also include a server 116 connected to the network 112. The server 116 may also be referred to as a session control server, and in some implementations the above-mentioned communication sessions may be established and routed through the server 116. That is, a communication session may be established by the transmission of a request from one of the devices 104 and 108 to the server 116. The server 116 may then communicate with the other device to establish the communication session. Data exchanged by the devices 104 and 108 during the communication session (e.g. packets of voice data, or the like) may also be routed between the devices 104 and 108 via the server 116. In other examples, the server 116 may be omitted, and communication sessions can be established and conducted directly by the devices 104 and 108.

Certain internal components of the devices 104 and 108, as well as the server 116, are illustrated in FIG. 1. In particular, the first computing device 104 includes a controller, such as a processor 120, interconnected with a non-transitory computer readable storage medium, such as a memory 122. The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. The computing device 104 also includes a communications interface 124 enabling the computing device 104 to exchange data with other computing devices via the network 112.

The device 104 can also include output devices, such as a display 126 and/or a speaker 128. Other output devices such as indicator lights, vibration motors, and the like are also contemplated. The speaker 128 and the display 126 can, for example, generate output (e.g. graphical and audio output) to present data received from the device 108 during a communication session to an operator of the device 104. The device 104 can also include input devices, such as a microphone 130 configured to capture audio, such as speech of the operator mentioned above, for transmission to the device 108 during a communication session. The device 104 can also include other input devices, such as a camera, a keypad, a touch screen, and the like.

The memory 122 stores computer readable instructions for execution by the processor 120. In particular, the memory 122 stores communication application 132 which, when executed by the processor 120, configures the processor 120 to establish and participate in communication sessions with other devices, including the device 108.

The second computing device 108 includes a processor 140, a memory 142, a communications interface 144, a display 146, a speaker 148, and a microphone 150 that operate substantially as discussed above in connection with the corresponding components of the device 104. As will be apparent to those skilled in the art, although the devices 104 and 108 include functionally similar components, the specific implementations of those components, as well as the form factors of the devices 104 and 108, need not be identical. The device 108 stores, in the memory 142, a communication application 152 whose execution by the processor 140 enables the device 108 to participate in communication sessions, e.g. with the device 104.

The server 116 includes a processor 160 interconnected with a memory 162 and a communications interface 164. The memory 162 stores, in the illustrated example, a session control application 166 and a repository 168 of communication session initiation parameters, which may also be referred to as initiation status data.

Communication sessions such as voice calls may be terminated deliberately by either or both of the devices 104 and 108 (e.g. by selection of a "hang up" input element presented on the displays 126 or 146). In some cases, however, a communication session may be terminated unexpectedly, e.g. due to network congestion, loss of network connection at either or both of the devices 104 or 108, software or hardware failures at the devices 104 or 108, or the like.

Following an unexpected disconnection, the operators of each of the devices 104 and 108 may control the devices 104 and 108 to attempt to reestablish communication. For example, the device 104 may be controlled to initiate a call to the device 108, and the device 108 may be controlled to initiate a call to the device 104. In some instances, such outgoing calls may be generated simultaneously, with the result that neither of the devices 104 and 108 are able to accept an incoming call (already being busy issuing an outgoing call). The attempt to reestablish unexpectedly terminated communication sessions may therefore fail, with both devices 104 and 108 receiving busy signals, call waiting signals, or the like.

The devices 104 and 108 (via execution of the applications 132 and 152) are therefore configured to implement functionality to mitigate against simultaneous reconnection attempts in the event of unexpected session terminations. In some embodiments, the server 116, via execution of the application 166 and use of the repository 168, is configured to perform the above functionality. The initiator status data maintained in the repository 168 indicates, for a given communication session, which of the devices 104 or 108 initiated the session. As will be seen below, the devices 104 and 108 may themselves store initiator status data in some examples.

Those skilled in the art will appreciate that the functionality implemented by the processors 120, 140, and 160 via the execution of the applications 132, 152, and 166 respectively, may also be implemented by one or more specially designed hardware and firmware components, such as FPGAs, ASICs and the like in other embodiments.

Figure 2:
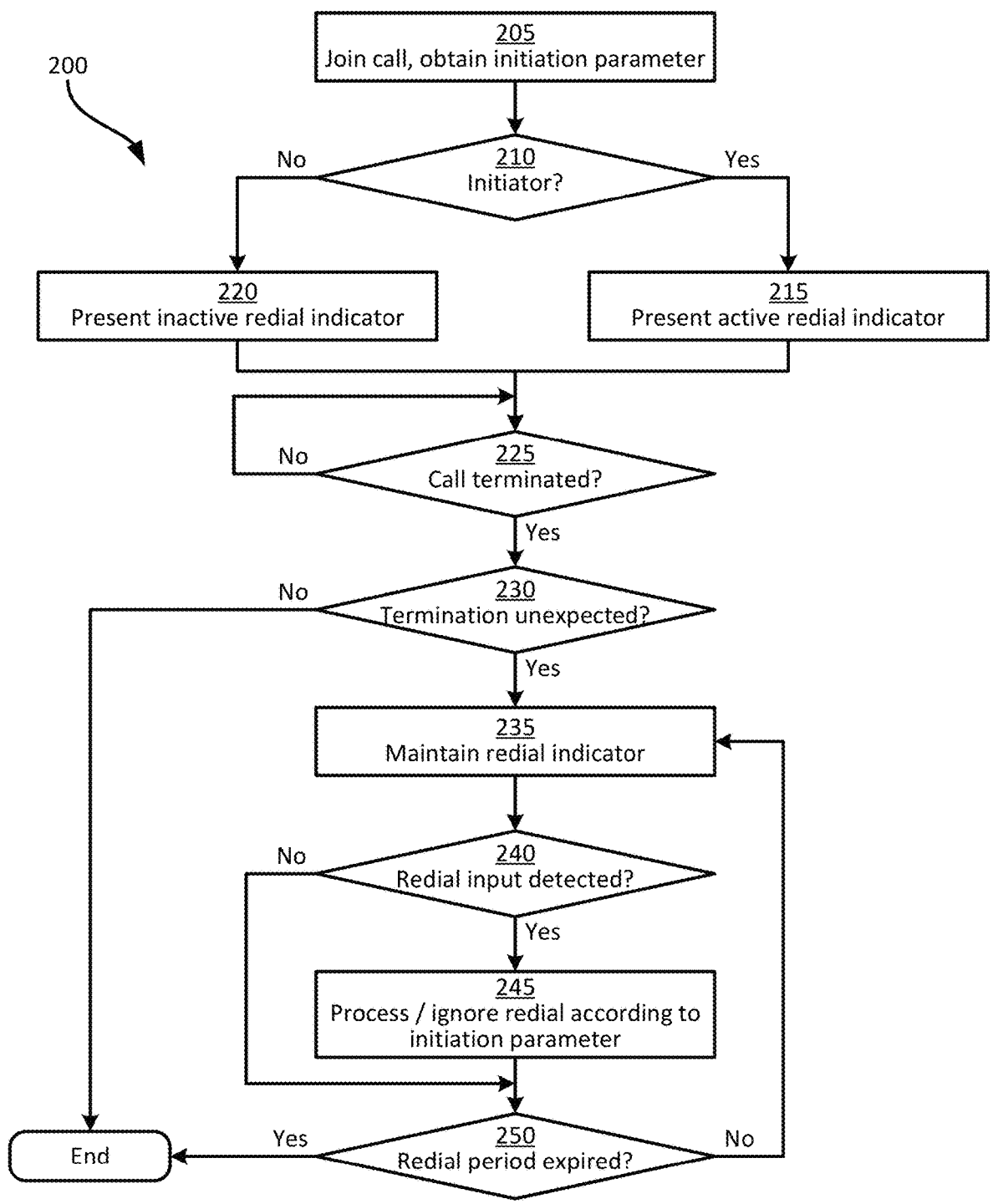
FIG. 2 is a flowchart of a method of communication session reestablishment control.

Turning to FIG. 2, a method 200 of reestablishing dropped calls is illustrated. The method 200 is performed by each of the devices 104 and 108. That is, during a communication session, parallel performances of the method 200 are undertaken at each of the devices 104 and 108. Both instances of the method 200 will be described in the example below. Performance of the method 200, in other words, enables the devices 104 and 108 to implement session reestablishment independently of the server 116 (e.g. when the server 116 is omitted from the system 100). Via performance of the method 200, the devices 104 and 108 may reduce the incidence of simultaneous reestablishment attempts in the event of an unexpectedly terminated (i.e. dropped) communication session.

Figure 3:
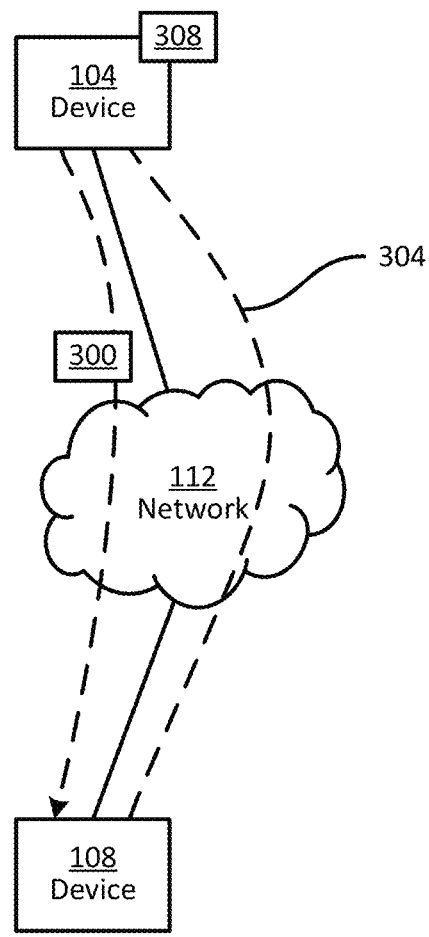
FIG. 3. is a diagram illustrating an example performance of block 205 of the method of FIG. 2.

At block 205, the device 104 joins a communication session, e.g. with the device 108. The device 108 also joins, via a local performance of block 205, the communication session. The communication session can be joined in various ways. For example, the device 104 can initiate the communication session at block 205 by sending a session invitation or other call initiation data to the device 108 via the network 112. For example, turning to FIG. 3, the device 104 is shown sending session initiation data 300 to the device 108. The session initiation data can include identifiers of each of the devices 104 and 108, and may also include other parameters defining the session (e.g. bandwidth limits, video or audio compression parameters, and the like). Responsive to receipt of the data 300 at the device 108, a communication session 304 is established, during which audio and/or video data can be exchanged between the devices 104 and 108.

At block 205, the devices 104 and 108 are also configured to obtain a communication session initiation parameter, which is also referred to herein as initiator status data. The initiator status data indicates, for each device 104, whether that device initiated the communication session. For example, turning to FIG. 3, when the device 104 transmits the data 300, the device 104 may also store initiator status data 308 (e.g. in the memory 122) indicating that the device 104 itself initiated the session 304. The communication session initiation parameter 308 can include a binary flag (e.g. with a value of one when the device 104 is the initiator, and a value of zero otherwise). The device 108, upon joining the session 304, also determines that the session 304 was not initiated by the device 108 itself. The device 108 therefore does not store initiator status data. In other examples, the device 108 can store initiator status data such as the above-mentioned binary flag, with a value of zero. In other examples, both devices 104 and 108 can store initiator status data that contains a device identifier (e.g. a phone number or the like) corresponding to the device that initiated the session 304. Thus, in such examples, both the devices 104 and 108 can store status initiator data containing an identifier of the device 104.

The status initiator data mentioned above can be exchange explicitly between the devices 104 and 108, e.g. in a initiator status field defined by the messaging protocol employed to establish and carry on the session 304. In other examples, each device 104 and 108 can determine the initiator status data implicitly, e.g. based on the fact that the session initiation data 300 originated at the device 104.

Returning to FIG. 2, at blocks 210, 215 and 220, the devices 104 and 108 can configure and present redial indicators according to the initiator status data from block 205. In other examples, the redial indicator can be omitted.

When the redial indicator is employed, at block 210, each device 104 is configured to determine whether the device itself is the initiator of the session, as indicated by the initiator status data. When the determination at block 210 is affirmative, the device proceeds to block 215. At block 215, the device configures the redial indicator in an active state, and presents the active redial indicator, e.g. on the display. When the determination at block 210 is negative, however, the device configures the redial indicator as inactive, and at block 220, presents the inactive redial indicator.

Figure 4:
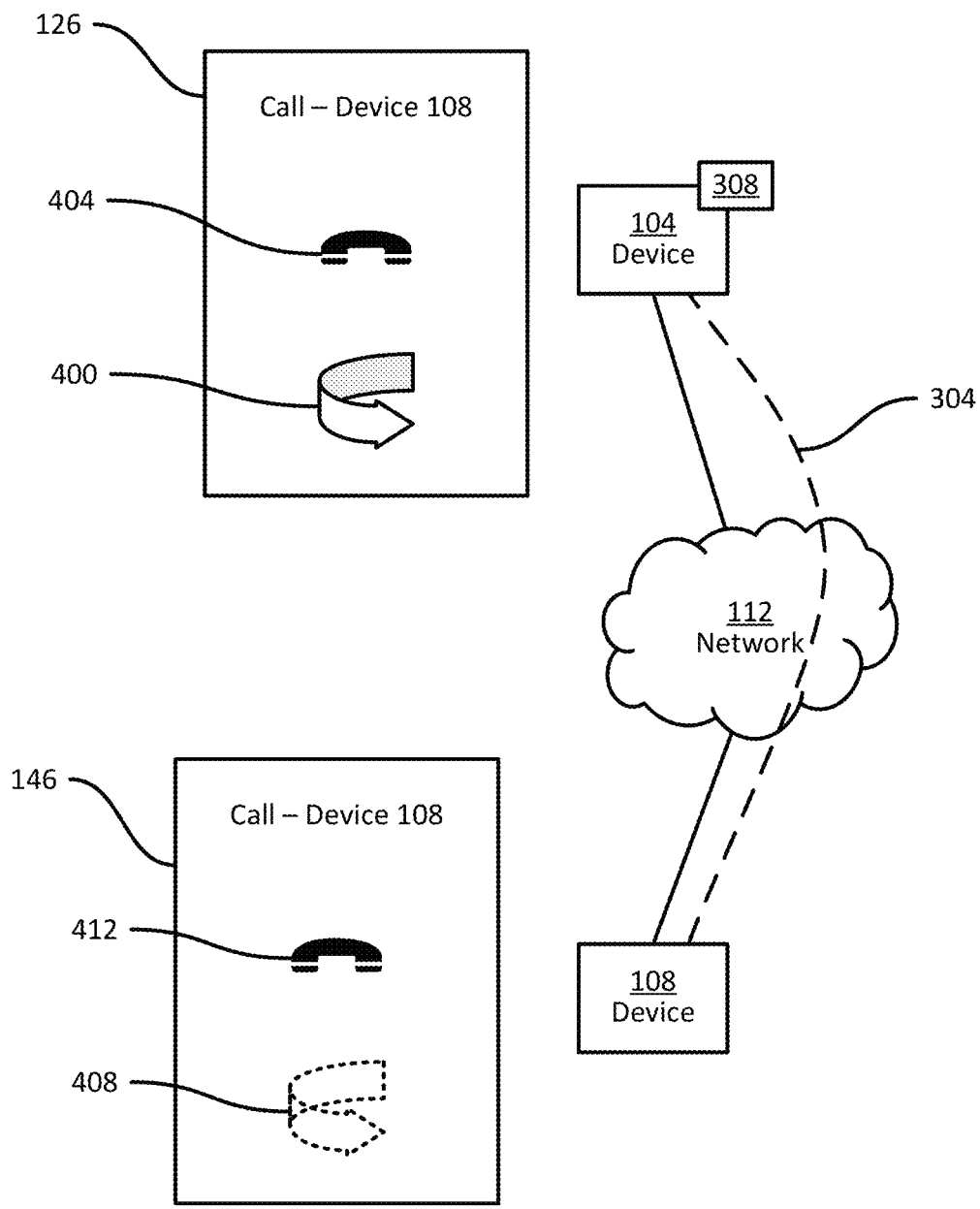
FIG. 4 is a diagram illustrating redial indicators generated by the devices of the system of FIG. 1 at blocks 215 and 220 of the method of FIG. 2.

For example, referring to FIG. 4, the displays 126 and 146 of the devices 104 and 108 are shown following performances of block 210 at each device. In particular, the determination at block 210 at the device 104 is affirmative, because the device 104 is the initiator of the session 304. The device 104 is therefore configured to present, e.g. by rendering on the display 126, an active redial indicator 400. The indicator 400 may be presented along with other elements of a session control interface, such as a termination button 404 selectable to terminate the session 304. Other session control interface elements can include a numerical keypad, a "hold" button, a button selectable to merge another session with the session 304, and the like.

The indicator 400 is shown in an active state, such as in solid lines, in a predetermined active color, or the like. The device 108, meanwhile, makes a negative determination at block 210 and therefore proceeds to block 220. At block 220, the device 108 presents the redial indicator in an inactive state. An inactive redial indicator 408 is shown as presented on the display 146, along with a termination button 412. The indicator 408 is distinguished from the active-state indicator 400 by color, shading or the like. For example, the indicator 408 may be grayed or ghosted in comparison to the indicator 400 to indicate inactivity. In other examples, in the inactive state the indicator 408 may simply not be rendered on the display 146.

The indicators 400 and 408 indicate, to the operators of the devices 104 and 108, whether attempts to reestablish the session 304 in the event of an unexpected disconnection, should be made from the respective devices 104 and 108. That is, the indicator 400 indicates that if the session 304 is unexpectedly terminated, e.g. due to a networking failure, the device 104 should be controlled to initiate an attempt to reestablish the session 304 (e.g. by sending new session initiation data to the device 108). The indicator 408, on the other hand, indicates that in the event of an unexpected disconnection, the device 108 should not be controlled to reestablish the session 304, so as to avoid interfering with reestablishment attempts by the device 104.

In some examples, the indicator 400 (i.e. in the active state) may be selectable to initiate an attempt to reestablish an unexpectedly disconnected session, as will be described below.

Returning to FIG. 2, following presentation of the indicators 400 or 408, the devices 104 and 108 proceed to block 225. At block 225, each device 104 and 108 determines whether the session 304 has terminated. When the determination at block 225 is negative, the devices 104 and 108 continue exchanging data within the session 304, and presenting the indicators 400 and 408 as noted above.

When the determination at block 225 is affirmative, each device 104 and 108 proceeds to block 230. At block 230, the devices 104 and 108 determine whether the termination was unexpected. Determination of whether a session termination was unexpected can be based on various factors. For example, each device 104 and 108 can determine whether the termination button 404 or 412 was selected (indicating deliberate, and therefore expected termination of the session 304).

In some communication sessions, a termination command from one device may be explicitly signaled to the other device(s) in the session, enabling each device to determine whether any of the devices in the session deliberately terminated the session. In other communication sessions, the devices may not exchange such explicit termination indications, and each device may therefore determine only whether that device itself terminated the session at block 230.

When the determination at block 230 is negative, indicating that the session was explicitly terminated by one of the involved devices, performance of the method 200 ends, and the initiator status data may be discarded. When the determination at block 230 is affirmative, however, the device 104 or 108 proceeds to block 235. As will now be apparent, the device 104 and the device 108 may make different determinations at block 230, when the session 304 does not support explicit termination signaling. For example, if the device 108 receives a selection of the termination element 412, but that selection is not communicated to the device 104, the device 104 detects that the session 304 has been terminated and that the device 104 itself did not cause the termination, but may be unaware that the device 108 caused the termination. The device 104 may therefore make an affirmative determination at block 230, while the device 108 makes a negative determination at block 230. The discussion of the remainder of the method 200 below assumes that the session 304 supports explicit communication of termination events such as selections of the termination elements 404 and 412.

At block 235, the device 104 and 108 each maintain the redial indicators on the respective displays 126 and 146. For example, each of the devices 104 and 108 can be configured to maintain the call interface shown in FIG. 4, rather than dismissing the interface upon termination of the session 304, as would be done in the event of an expected termination.

At block 240, each device 104 and 108 is configured to determine whether a redial input has been detected (e.g. an attempt to reestablish the session 304). The redial input can be, for example, receipt of a selection of the redial element 400 at the device 104. The redial input can also be a selection of an identifier of the device 108 via a keypad of the device 104, contact list of the device 104, or the like. At the device 108, the inactive redial indicator 408 may be configured as a non-selectable element, and the receipt of a redial input may therefore be limited to keypad or contact-based selection of an identifier of the device 104, or other mechanisms excepting selection of the redial indicator 408.

In some examples, the redial input can be generated automatically by the device 104. That is, at block 240, in addition to detecting operator-initiated redial input, each device 104 may determine whether to generate redial input, independently of selection of the redial indicator, keypad buttons, or the like. For example, each device 104 and 108 can store redial configuration settings defining whether an automatic redial attempt is to be generated when a call is unexpectedly terminated. The determination may also be based on the communication session initiation parameter. For example, an automatic redial attempt may only be generated when the communication session initiation parameter indicates that the device itself initiated the communication session.

When the determination at block 240 is affirmative, performance of the method 200 proceeds to block 245. At block 245, the device 104 or 108 is configured to handle the redial input according to the initiator status data/communication session initiation parameter obtained at block 205. In particular, if the initiator status data indicates that the device initiated the session 304, the redial input is processed to initiate anew session (i.e. to reestablish communication with the other device). For example, if the device 104 detects redial input following an unexpected disconnection, at block 245 the device 104, in light of the initiator status data 308, processes the redial input by sending new session initiation data to the device 108.

The device 108, on the other hand, ignores redial input detected at block 240, because the device 108 is not the initiator of the session 304 in this example. The redial input is therefore discarded by the device 108 without sending session initiation data to the device 104. Also at block 245, the device 108 may present an indication (e.g. on the display 146) that the redial input was discarded, to wait for a reconnection attempt by another device.

Following block 245, or following a negative determination at block 240, performance of the method 200 proceeds to block 250. At block 250, each device 104 and 108 determines whether a preconfigured redial period has expired. Specifically, following an affirmative determination at block 230, the devices 104 and 108 begin a redial time period (e.g. 10 seconds, although both shorter and longer periods may be employed in other examples), and the performance of blocks 235 to 245 are repeated continuously until the redial time period ends. The redial time period, in other words, defines a time period during which the functionality implemented by the devices 104 and 108 to avoid collisions between session reestablishment attempts is active. After the expiry of that time period (or after reestablishment of the session 304, whichever is earlier), such functionality ceases to be active.

Thus, when the determination at block 250 is negative, blocks 235, 240 and 245 can be repeated. When the determination at block 250 is affirmative, however, the performance of the method 200 ends, presentation of the redial indicators 400 and 408 can be dismissed, and the initiator status data 308 can be discarded.

Figure 5:
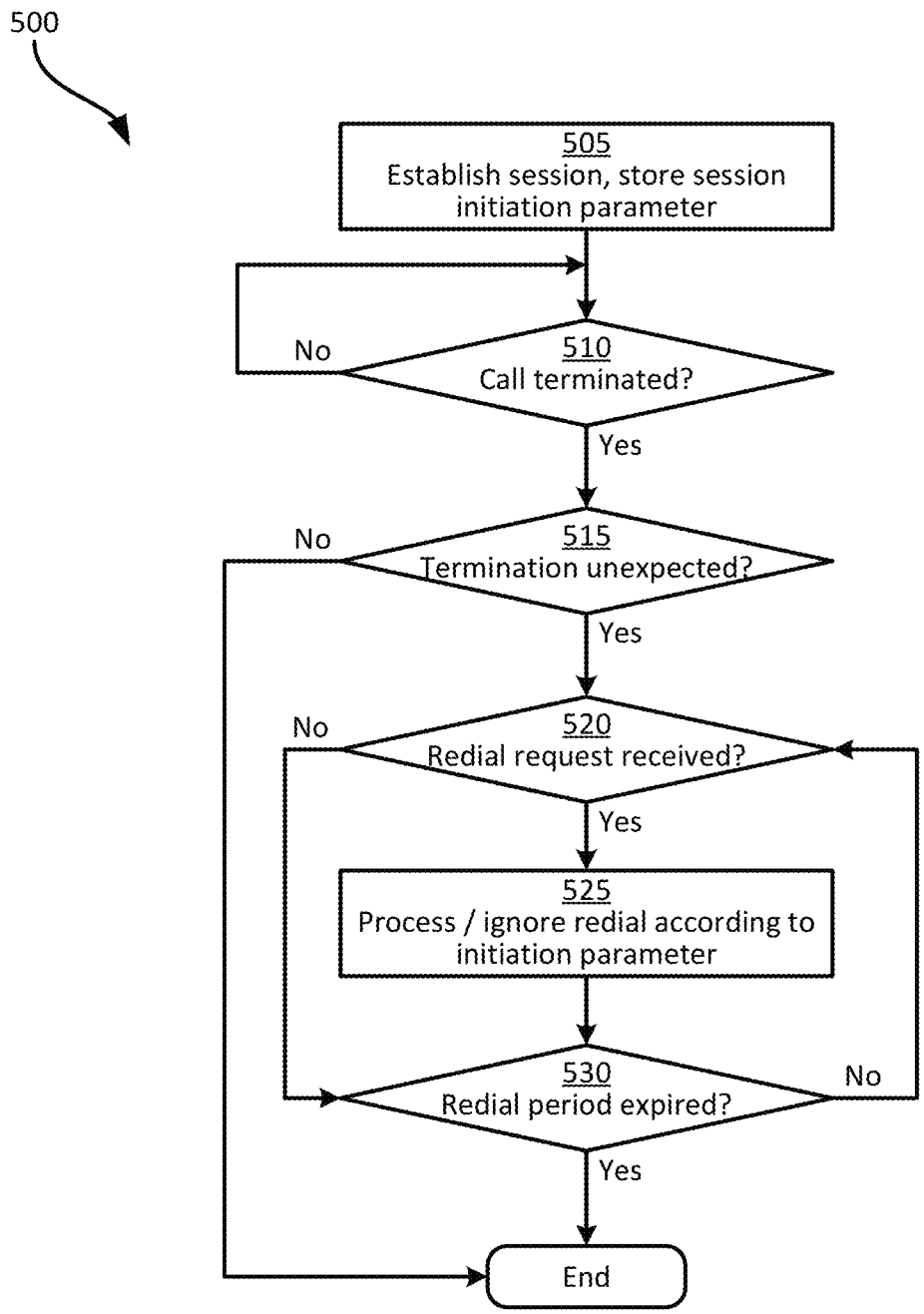
FIG. 5 is a flowchart of a method of communication session reestablishment control.

Turning to FIG. 5, in some examples, the server 116 assists in implementing the collision-avoidance functionality discussed above. Specifically, FIG. 5 illustrates a method 500 of session reestablishment control, performed by the server 116 via execution of the application 166.

Figure 6:
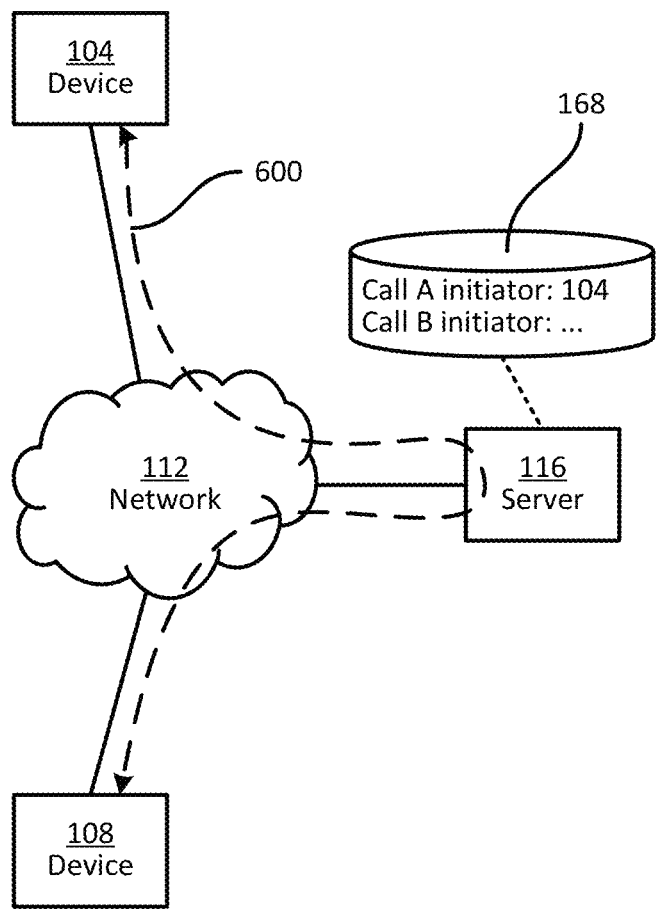
FIG. 6 is a diagram illustrating an example performance of block 505 of the method of FIG. 5.

At block 505, the server 116 establishes a communication session between the devices 104 and 108, e.g. in response to a request from the device 104. For example, the device may send the initiation data 300 to the server 116 instead of directly to the device 108. Also at block 505, the server 116 stores initiator status data indicating which of the first computing device 104 and the second computing device 108 initiated the communication session. For example, referring to FIG. 6, a session 600 is shown having been established between the devices 104 and 108, via the server 116.

In addition, the repository 168 stores initiator status data indicating that the device 104 initiated the session 600. As will be apparent, the server 116 can store initiator status data for a plurality of communication sessions being carried out simultaneously (e.g. between distinct pairs of devices).

Returning to FIG. 5, at block 510 the server 116 is configured to determine whether the session 600 has been terminated. When the determination at block 510 is negative, the server 116 continues to mediate between the devices 104 and 108. When the determination at block 510 is affirmative, the server 116 determines whether the termination is unexpected at block 515. The determination at block 515 includes, for example, determining whether an explicit termination command (e.g. arising from the selection of a termination element 404 or 412) was received from either device 104 or 108. When the determination at block 515 is negative, performance of the method 500 ends, and the initiator status data from block 505 can be discarded.

When the determination at block 515 is affirmative, the server 116 proceeds to block 520, to determine whether a redial request has been received from either device 104 or 108. The redial request can arise from the redial inputs discussed above in connection with block 240 of the method 200, with the exception that the devices 104 and 108 may be configured to always transmit such input to the server 116 in this example, rather than determining locally whether to process or ignore redial input.

Responsive to an affirmative determination at block 520, at block 525 the server 116 processes or ignores the redial request according to the initiator status data from block 505. For example, if the redial request was received from the same device that initiated the session 600 (e.g. the device 104, in the example shown in FIG. 6), the redial request is processed to reestablish the session 600. Otherwise, the redial request (e.g. from the device 108) can be ignored. The server 116 may, in some examples, transmit a notification to the device 108 indicating that the redial request was not processed to avoid collision with a redial request by the device 104.

At block 530, following a performance of block 525 or a negative determination at block 520, the server 116 is configured to determine whether a redial period has expired. As described above in connection with block 250, the server 116 initializes a redial period following an affirmative determination at block 515, and repeats the performances of blocks 520 and 525 until either that period expires, or the session 600 is reestablished (e.g. whichever happens first).

Variations to the above are contemplated. For example, the system 100 can implement a hybrid of the methods 200 and 500, in which the server 116 performs reestablishment control (i.e. via the method 500), and the devices 104 and 108 receive the initiator status data from the server 116. The devices 104 and 108 can therefore configure and present the redial indicators at blocks 220 and 215.

As will be apparent to those skilled in the art, the above functionality can be extended to communication sessions including more than two devices. For example, in a session involving three or more devices, each device can perform the method 200 to avoid collisions between attempts to reestablish a session.

In other examples, the redial indicators 400 and 408 can be omitted, and the devices 104 and 108 can skip from block 205 directly to block 225.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of reestablishing a communication session between a first computing device and a second computing device, the method comprising, at the first computing device:
   obtaining a communication session initiation parameter, indicating whether the first computing device initiated the communication session;
   when the communication session initiation parameter indicates that the first computing device initiated the communication session, presenting a redial indicator in an active state;
   when the communication session initiation parameter indicates that the first computing device did not initiate the communication session, presenting the redial indicator in an inactive state; and
   controlling a reestablishment attempt following termination of the communication session according to the redial indicator, wherein the redial indicator is dismissed following session termination when it is determined that session termination is based on user input.

2. The method of claim 1, wherein obtaining the communication session initiation parameter includes, responsive to joining the communication session, determining whether the first computing device initiated the communication session.

3. The method of claim 1, wherein obtaining the communication session initiation parameter includes receiving the communication session initiation parameter from a server associated with the communication session.

4. The method of claim 1, wherein presenting the redial indicator includes: presenting the redial indicator on a display of the first mobile computing device during the communication session.

5. The method of claim 1, wherein determining that session termination is based on user input includes determining whether a command to end the call was generated by at least one of the first computing device and the second computing device.

6. The method of claim 1, wherein controlling a reestablishment attempt includes:
   detecting unexpected termination of the communication session;
   during a period of time, detecting a command to reestablish the communication session via an input device of the first computing device; and
   handling the command according to the communication session initiation parameter.

7. The method of claim 6, wherein the handling includes ignoring the command when the communication session initiation parameter indicates that the first computing device did not initiate the communication session.

8. The method of claim 1, wherein controlling the reestablishment attempt includes determining whether to automatically generate a reestablishment command according to the communication session initiation parameter.

9. A computing device, comprising:
   a communication interface configured to join a communication session between the computing device and a second computing device; and
   a processor interconnected with the communication interface, the processor configured to:
      obtain a communication session initiation parameter, indicating whether the computing device initiated the communication session;
      when the communication session initiation parameter indicates that the computing device initiated the communication session, present a redial indicator in an active state;
      when the communication session initiation parameter indicates that the when the communication session initiation parameter indicates that the computing device did not initiate the communication session, presenting the redial indicator in an inactive state; and
      control a reestablishment attempt following termination of the communication session according to the redial indicator, wherein the redial indicator is dismissed following session termination when it is determined that session termination is based on user input.

10. The computing device of claim 9, further comprising an output device including a display; wherein the processor is configured, to present the redial indicator, to control the display to present the redial indicator during the communication session.

11. The computing device of claim 9, wherein in order to obtain the communication session initiation parameter, the processor is configured to:
   responsive to joining the communication session, determine whether the computing device initiated the communication session.

12. The computing device of claim 9, wherein in order to determine that session termination is based on user input, the processor is configured to: determine whether a command to end the call was generated by at least one of the computing device and the second computing device.

13. The computing device of claim 9, wherein to control the reestablishment attempt, the processor is configured to:
   detect unexpected termination of the communication session;
   during a period of time, detect a command to reestablish the communication session; and
   handle the command according to the communication session initiation parameter.

* * * * *